Oct. 13, 1970  R. W. ROBBINS, JR., ET AL  3,533,897

OPTICALLY CLEAR ROUGHENED GLASS AND METHOD FOR MAKING SAME

Filed June 19, 1967

INVENTORS.
ROLAND W. ROBBINS, JR.
STEWART L. THORNE
BY

ROY MILLER
ATTORNEY.

United States Patent Office 3,533,897
Patented Oct. 13, 1970

3,533,897
OPTICALLY CLEAR ROUGHENED GLASS AND
METHOD FOR MAKING SAME
Roland W. Robbins, Jr., Arnold, Md., and Stewart L.
Thorne, Ridgecrest, Calif., assignors to the United
States of America as represented by the Secretary of
the Navy
Filed June 19, 1967, Ser. No. 647,888
Int. Cl. B32b 3/00, 17/10
U.S. Cl. 161—117                2 Claims

ABSTRACT OF THE DISCLOSURE

A method for making roughened glass surfaces optically clear and at the same time providing a protective covering to the surface. This method comprises cementing a preformed optically clear plastic sheet to a glass surface thereby avoiding expensive and time-consuming grinding and polishing processes.

---

The invention herein described may be manufactured and used by or for the Government of the United States of America for governmental purposes without the payment of any royalties thereon or therefor.

The invention relates to a method for making roughened or frosted glass optically clear and at the same time providing a protective covering to the glass surface.

The most common method of providing a protective coating to glass is to spray or brush a clear liquid plastic over the glass surface and allow it to dry. By this means it is practically impossible to get an optically smooth covering on the glass mainly due to the variations in surface wetting characteristics and in cohesion and adhesion between the glass and plastic. Furthermore, only a few mils thickness at a time may be applied to anything but a perfectly smooth, flat surface. If a thicker coating is attempted, runs and sags develop, thus destroying any optical properties of the coating. Optical clarity of a piece of roughened glass may be achieved by an elaborate, time-consuming and expensive grinding process. For massive glass articles the grinding process is prohibitive on a cost basis. The present invention overcomes these difficulties by providing a simple and inexpensive means for applying an optically clear protective covering to glass surfaces.

It is therefore an object of the present invention to provide an inexpensive means for making roughened or frosted glass of any contour optically clear.

Another object is to provide a simple, time-saving method of covering large areas of glass with an optically clear protector.

Yet another object is to provide an optically clear, saltwater resistant, coating for glass hemispheres to be used in small submersibles.

Other objects, features and many of the advantages of the present invention will become readily appreciated as the same become better understood by reference to the following detailed description when considered in connection with the accompanying drawings wherein.

Figure 1:
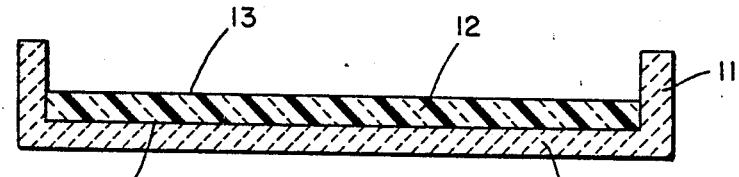
FIG. 1 is a longitudinal section of a mold which is employed in preparing a sheet or film of plastic in accordance with this invention.
Figure 2:
FIG. 2 is a section of a preformed plastic sheet suitable for use in the practice of this invention.

Referring now to FIG. 1 there is shown a mold 10 having a glass bottom provided with rims 11 into which a predetermined amount of clear plastic liquid was poured and allowed to cure to form sheet 12. The face up side or outer portion of sheet 12 during cure is designated by numeral 13 and the side in contact with the bottom of said mold 10 is designated by numeral 14. Upon curing sheet 12 as shown in FIG. 2 is carefully peeled or stripped off the bottom of the mold. The plastic sheet used in this invention must be optically clear, flexible, resilient, and undamaged.

Figure 3:
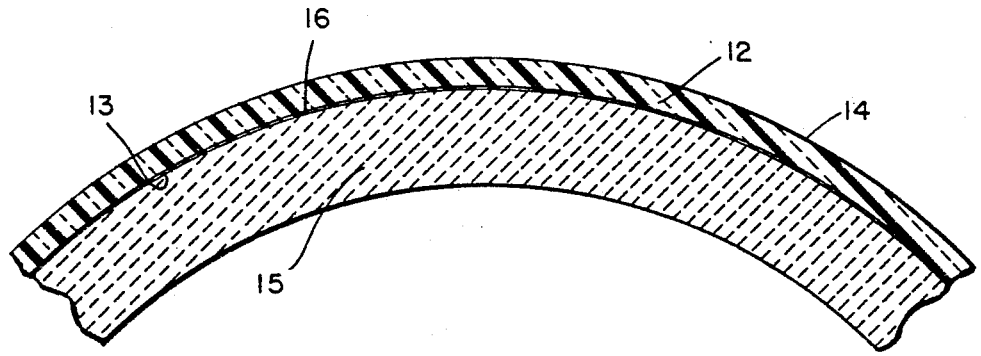
FIG. 3 is a section of a glass hemisphere covered with the optically clear protective plastic in the practice of this invention.

A section of a glass hemisphere 15 as shown in FIG. 3 was sprayed with the clear plastic from which sheet 12 was prepared to form adhesive layer 16. When layer 16 becomes tacky sheet 12 is inverted and carefully smoothed onto the hemisphere so that no air bubbles are entrapped. This step is critical to the success of the invention. Sheet 12 must be inverted so that the outer of face up side during cure is brought in contact with adhesive 16. Hemisphere 15 which had been frosted from use was now optically clear, and plastic sheet 12 also provided protection from further roughening due to the elements, wind and water, and also from cracking.

The following examples are given to further illustrate the method described above.

EXAMPLE I

A piece of clean plate glass 20" x 38" x ⅛" was coated to a thickness of ⅛ inch with a clear epoxy-polyester liquid, "Adheron," sold by Hauger-Beegle Association, Incorporated. After the "Adheron" had cured for a period of 48 hours it was stripped from the glass as one continuous piece. A 44½" glass hemisphere which had been badly frosted was cleaned with alcohol and a light coat of "Adheron" was brushed thereon and allowed to dry until tacky. The stripped sheet of "Adheron" was then smoothed over the tacky adhesive layer of "Adheron." The side of the "Adheron" sheet which was formed in contact with the glass was left as the outer or exposed side when placed on the hemisphere. The hemisphere which had been badly frosted due to exposure was now transparent and was excellent optically.

EXAMPLE II

To test impact, a square of glass 4" x 4" x ⅛" was cleaned with alcohol, coated with a layer of "Adheron" and allowed to dry. After letting it set for 9 days it was shock tested with a steel ball weighing 535 grams dropped from a height of 32 inches. The specimen was tested twice and the glass did not crack and there were no visible marks left on the material.

EXAMPLE III

A 10" hemisphere which was roughened was cleaned with alcohol and spray coated with "Adheron" and allowed to dry. After drying the coating had small lines through it which caused optical distortion.

A piece of clear, smooth glass 4" x 4" x ⅛" was cleaned with alcohol. The glass was coated with "Adheron" and allowed to dry. The "Adheron" was then removed from the glass in a sheet. A small area on another roughened hemisphere was lightly brushed with "Adheron" and when this became sticky, the sheet was smoothed onto the top of the hemisphere with the side that was stripped from the glass plate now the exposed side or outside surface of the coated hemisphere. After drying the hemisphere was checked for its clarity, and one could see through it quite well. Care must be taken to apply the optically clear sheet without creating air pockets because they cannot be successfully removed. Stretching will cause stress cracks and air bubbles cause optical distortion. The plastic used in Examples I, II, and III is sold under the trade name "Adheron" by Hauger-Beegle Associates, Incorporated. It is described in their literature as a blend of an oxirane-modified ester and a polyester which they procure from Archer Daniels Midland Company known by the trade name "Aroflint." The material "Aroflint" consists of a two-component resin system described in U.S. Pat. Nos. 3,050,480 and 3,218,274, assignor to Archer Daniels Midland Company, Minneapolis, Minn.

It is important that the coating or protective material used in the present invention withstand pressure and immersion in salt water for long periods of time and remain crystal clear. This coating must not only remain optically clear, but must at the same time be resistant to scratches, chipping, frosting, cracking, etc.

As shown in a single embodiment of the present invention, only one surface of the glass hemisphere is covered. However, both surfaces may be successfully coated thereby providing greater protection from cracking, chipping and frosting or roughening. The hemisphere might comprise in the following order and in contiguous contact (1) an optically clear plastic layer, (2) an optically clear adhesive layer, (3) glass layer (hemisphere), (4) same type optically clear adhesive layer, and (5) same type plastic layer.

Obviously, many modifications and variations of the present invention are possible in the light of the above teachings.

What is claimed is:

1. A method for making roughened glass surfaces optically clear and at the same time providing a protective covering which comprises
   (a) preforming a sheet of optically clear plastic of a predetermined thickness by (1) pouring a quantity of clear liquid plastic consisting essentially of a mixture of an oxirane-modified ester and a polyester into a flat bottomed mold, (2) curing said plastic until a flexible, resilient sheet forms, (3) stripping said sheet from the mold in one continuous, undamaged piece; said sheet having a face-up side and a face-down side, said face-down side being that side which was in contact with the bottom of said mold during cure;
   (b) coating the roughened glass surface with a relatively thin film of the same plastic used in preparing said sheet thereby forming an adhesive layer;
   (c) smoothing said preformed sheet over said adhesive layer with the face-up side of said sheet in contact with said layer; and
   (d) curing until firm.
2. An optically clear laminatae formed according to claim 1.

References Cited

UNITED STATES PATENTS

| 2,297,787 | 10/1942 | Locke | 161—409 X |
| 2,362,980 | 11/1944 | Ball | 161—6 |
| 3,050,480 | 8/1962 | Budde | 260—22 |
| 3,218,274 | 11/1965 | Boller et al. | 260—22 |
| 3,328,499 | 6/1967 | Barnette | 264—108 |
| 3,389,029 | 6/1968 | Forman et al. | 161—6 X |
| 3,408,421 | 10/1968 | Kurka | 260—835 X |

JOHN T. GOOLKASIAN, Primary Examiner

R. A. KILLWORTH, Assistant Examiner

U.S. Cl. X.R.

156—246, 249, 330, 332; 161—119, 185, 194, 409